INVENTOR.
Willard B. McCardell
BY
Harness, Dickey & Pierce
ATTORNEYS

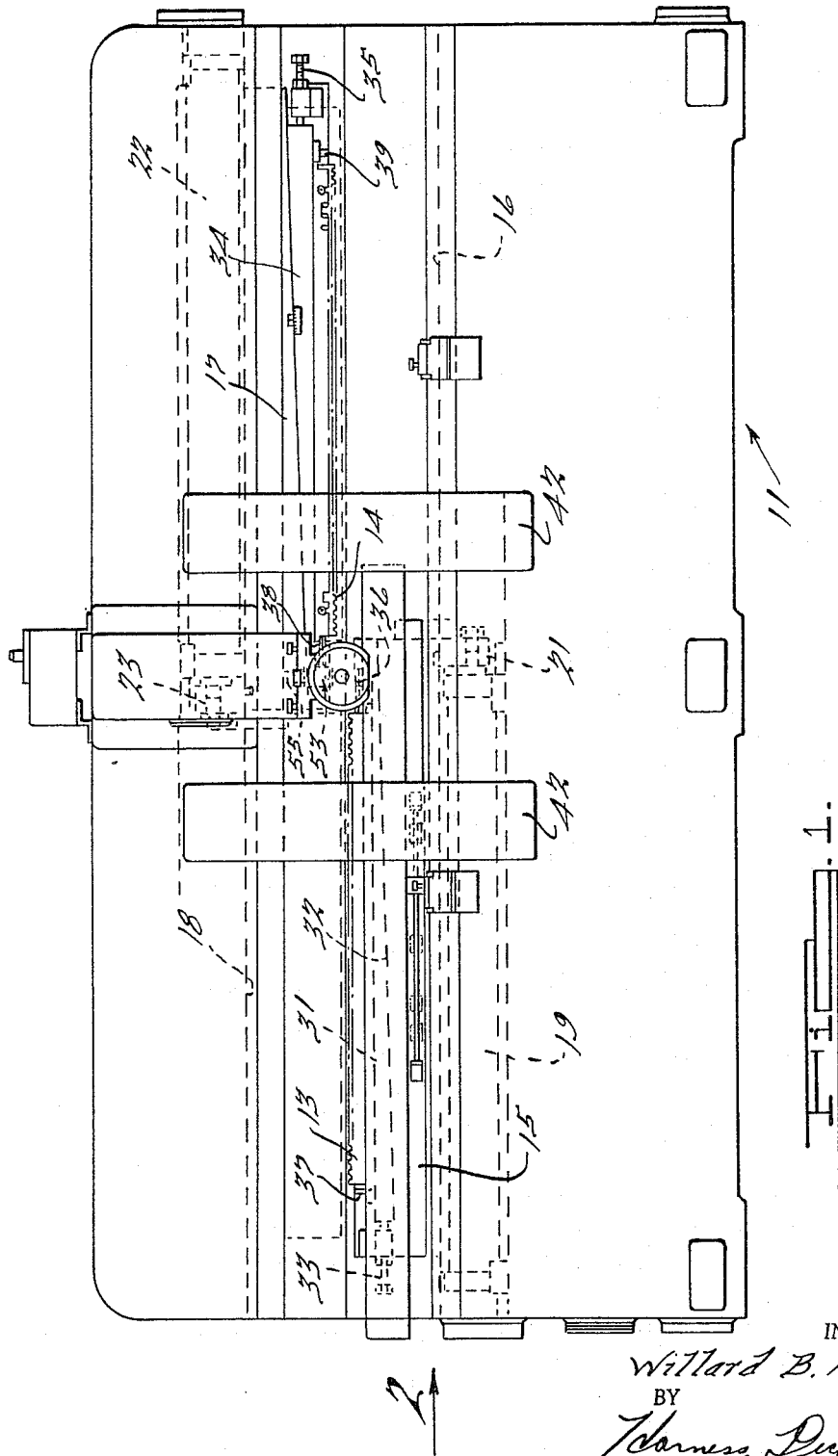

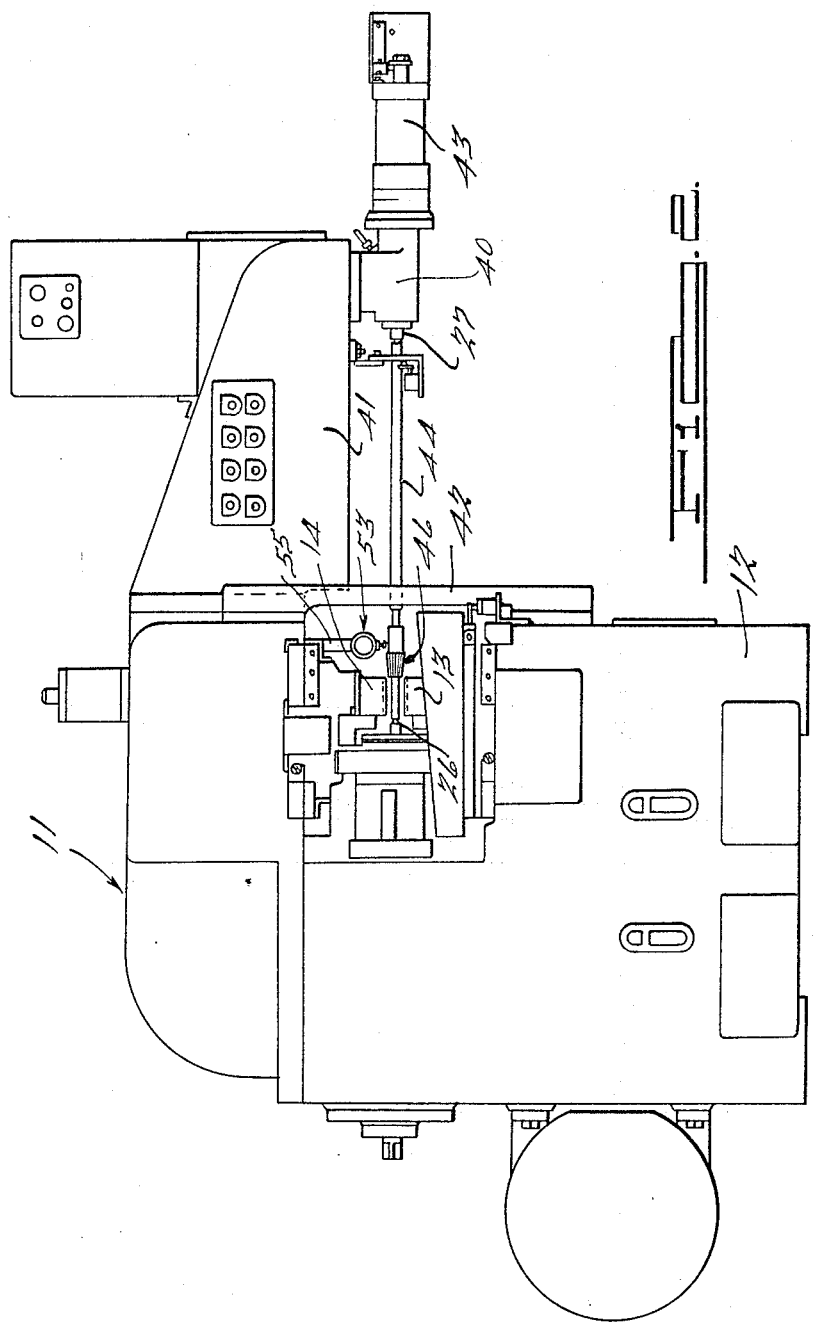

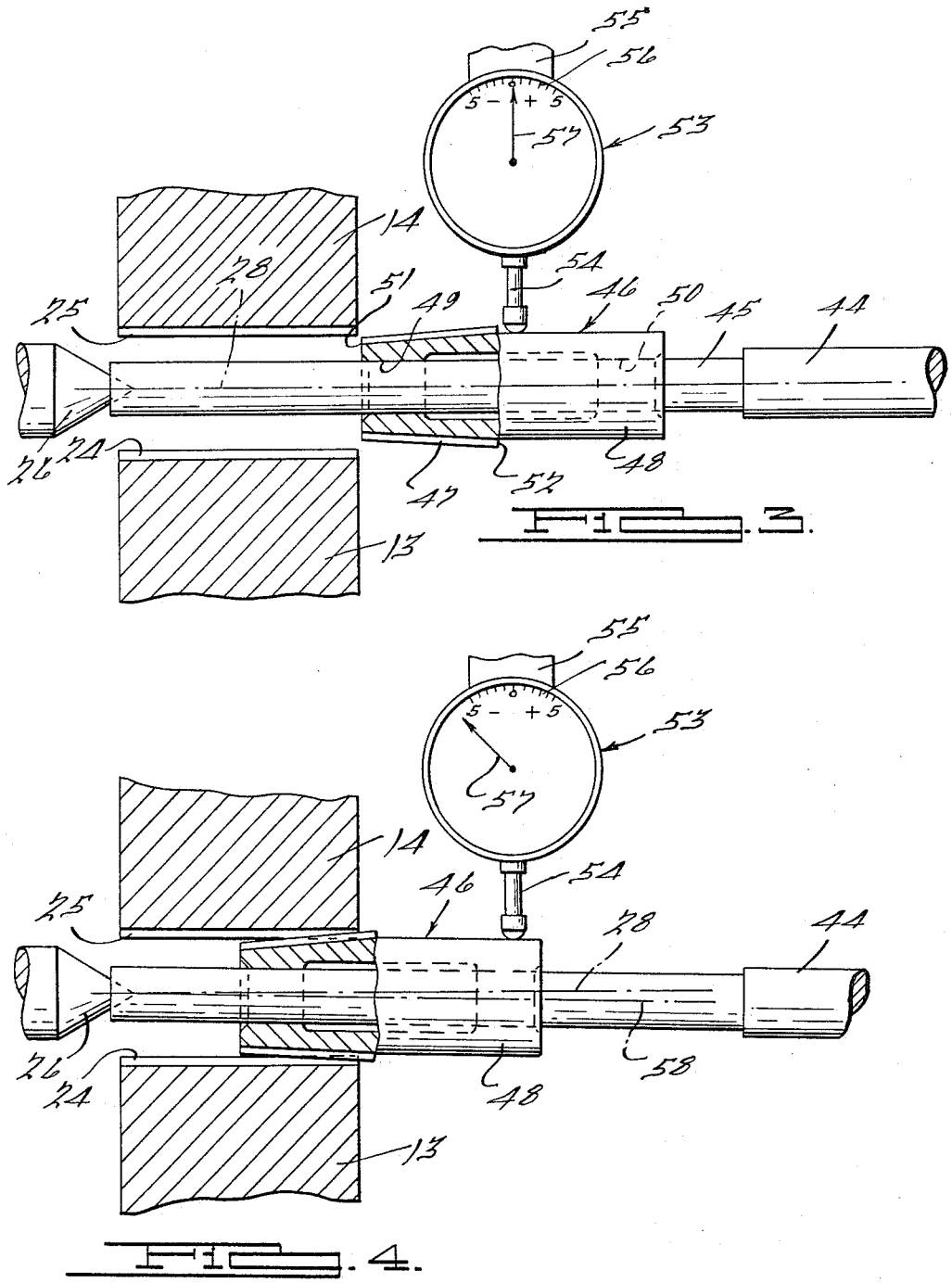

United States Patent Office 3,267,582
Patented August 23, 1966

3,267,582
METHOD AND APPARATUS FOR SETTING UP TOOLS FOR FORMING TEETH ON WORKPIECES
Willard B. McCardell, Royal Oak, Mich., assignor to Michigan Tool Company, Detroit, Mich., a corporation of Delaware
Filed Feb. 7, 1963, Ser. No. 257,041
8 Claims. (Cl. 33—185)

This invention relates to tooth forming methods and apparatus, and more particularly to methods and apparatus for setting up tooth forming tools of the type which act simultaneously in pairs to impress teeth on circular workpieces by rolling conjugate action. Such tools are shown, for example, in Patent No. 2,995,964, issued August 15, 1961, to Joseph C. Drader.

It is extremely important when using such tools that they be spaced exactly the same distance from the workpiece centerline, and also that the desired relative alignment between the two sets of tool teeth be accurately fixed. If these conditions are not met, the likelihood and frequency of tool breakage and the production of poor quality parts are greatly increased, especially under high production conditions of operation.

It is an object of the present invention to provide a novel and improved method and apparatus for setting up and checking the above-described tools which will insure their proper spacing from the workpiece centerline as well as proper relative alignment of their teeth, thus greatly reducing tool breakage problems.

It is another object to provide an improved method and apparatus of this character which is of simplified and inexpensive construction and is quick and easy to operate.

Other objects, features, and advantages of the present invention will become apparent from the subsequent description, taken in conjunction with the accompanying drawings, in which:

FIGURE 1 is a front elevational view of a tooth forming machine of the type shown in the above-mentioned patent, showing the location of the novel checking apparatus of this invention;

FIG. 2 is a side elevational view of the machine taken in the direction of the arrow 2 of FIGURE 1 and further showing the positioning of the apparatus of this invention;

FIG. 3 is an enlarged side elevational view, partly sectioned, of the gauge before entering the space between the tools, and with the dial indicator in position for checking the relative tool spacing from the workpiece centerline;

FIG. 4 is a view similar to FIG. 3 but with the gauge entered into the space between the tools, showing the manner of shaft deflection when the upper tool is closer to the workpiece centerline than the lower tool;

Figure 5:
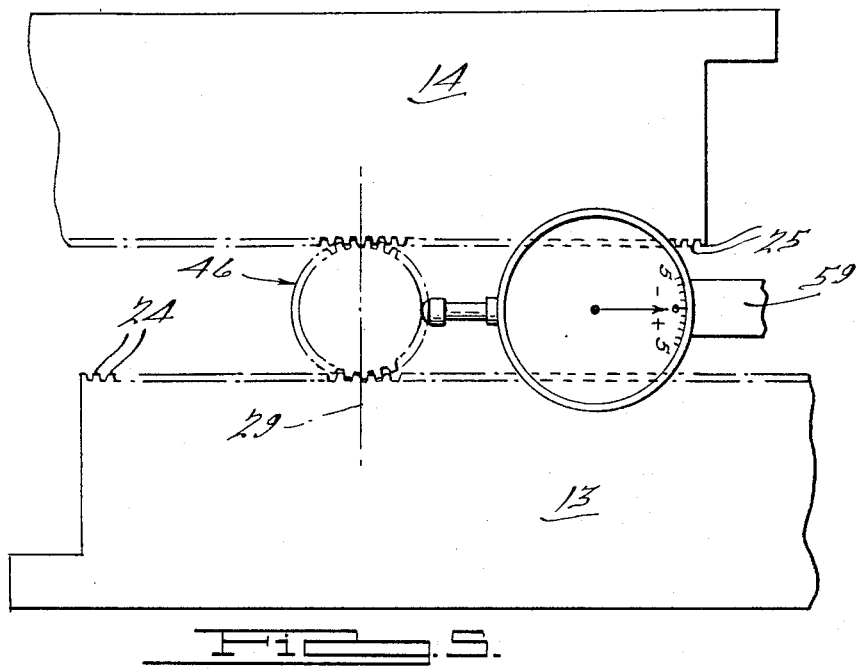
Figure 6:
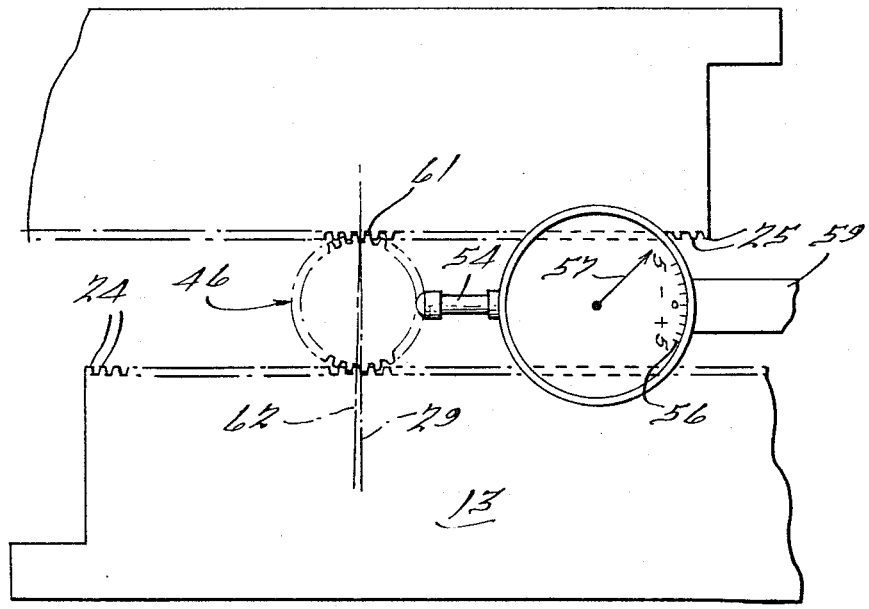

FIG. 5 is an enlarged front elevational view of finishing portions of the tools, parts being omitted, showing the dial indicator in position for checking a discrepancy in tooth alignment between the tools, the gauge not having as yet entered the space between the tools, and FIG. 6 is a view similar to FIG. 5 showing the manner of shaft deflection after the gauge has entered the space between the tools, where a discrepancy exists in tooth alignment.

Briefly, the illustrated embodiment of the invention comprises a gauge supporting rod which is placed between the two centers normally used to support the workpiece on which the teeth are to be formed by the oppositely moving tools. A gauge is slidably mounted on the rod, the gauge being of circular shape and having teeth like those on the workpiece to be formed, but with a slight flare in a direction away from the tools, the rearward end of the gauge defining the desired tooth form and thus the desired spacing between the tools. A hub with a cylindrical outer surface extends axially from the wider end of the gauge.

In operation, a dial indicator is mounted so as to engage the hub, and the gauge is inserted between the tools. To adjust the tools for proper spacing from the workpiece centerline, the dial indicator is positioned so as to measure deflection of the hub in a vertical plane and is set to zero before the gauge is inserted between the tools. If one tool is closer to the workpiece centerline than the other, the flared gauge will engage such tool first, and further axial movement of the gauge will cause the rod to deflect, this being indicated on the dial indicator. The closer tool may then be slightly withdrawn and the process repeated until the gauge can be inserted fully with no deflection.

The dial indicator is then moved so as to indicate gauge hub deflection in a horizontal plane, and the process repeated. As the gauge is inserted between the tools, any deviation from proper relative alignment of the teeth on the two tools in relation to the workpiece axis will result in horizontal deflection of the rod, shown on the dial indicator. One tool or the other may then be shifted longitudinally, until the gauge may be fully inserted without any horizontal deflection.

Referring more particularly to the drawings the tooth forming machine is generally indicated at 11 and comprises a rigid and generally C-shaped frame 12, as seen in FIG. 2, the frame being elongated as seen in FIGURE 1 so as to accommodate a pair of rack-type tooth forming tools, the lower tool being indicated at 13 and the upper tool at 14. Tool 13 is secured to a carriage 15 supported for horizontal sliding movement on a track 16 on frame 12, while tool 14 is secured to a carriage 17 mounted for horizontal sliding movement on a track 18 spaced above track 16. A fluid type reciprocating motor 19 is secured at 21 to an extension of carriage 15, and a reciprocating fluid motor 22 is connected at 23 to an extension of carriage 17. These motors are connected to a common source of fluid pressure and are adapted to simultaneously move tools 13 and 14 in opposite directions at the same speed. In FIGURE 1, the tools are shown in their initial positions for engaging a workpiece; tool 13 would advance to the right in FIGURE 1 while tool 14 advances to the left.

Upwardly facing teeth 24 on tool 13, indicated in FIGS. 3 to 6, and downwardly facing teeth 25 on tool 14, will simultaneously engage a circular workpiece (not shown) mounted for rotation on centers 26 and 27 carried by frame 11, thus forming teeth in the workpiece by conjugate action, as described in the aforementioned patent, the depth of the impression made on the workpiece gradually increasing as the tooth forming operation proceeds. For this purpose, the heights of teeth 24 and 25 increase gradually from the leading to the trailing ends of their respective tools, in a manner described more particularly in said patent. The details of these tooth shapes need not be described in the present application, since they are not per se part of the present invention. It should be stated, however, that the workpiece teeth will be formed by gradual displacement of material and by conjugate rolling action, each portion of the workpiece being alternately engaged by tools 13 and 14 as it rolls between them. It is therefore highly important that both sets of teeth 24 and 25 be spaced at exactly the same distance from the workpiece centerline, indicated at 28 in FIGURE 4, and that at each instant during movement the teeth 24 engaging the workpiece have an accurately predetermined alignment in a vertical plane with respect to the teeth 25 engaging the workpiece and with respect to the workpiece axis. If the workpiece is to have an even number of teeth, the center of the crest of each tooth 24 must be vertically aligned with the center of a crest of a tooth 25 as these crests pass a vertical plane through the workpiece centerline 28, such a vertical plane being indicated at 29 in FIG. 6. Expressed another way, since tools 13 and 14 move with equal speeds in opposite directions, for an even number of workpiece teeth like portions of teeth 24 and 25 must simultaneously pass vertical plane 29 through the workpiece centerline. With an odd number of workpiece teeth, tool teeth 24 and 25 must be offset exactly one-half the pitch distance of these teeth. That is, the center of a trough between teeth 24 must pass plane 29 as the center of a crest of a tooth 25 passes plane 29, and vice versa.

Means are provided for adjusting the vertical spacing of tools 13 and 14 from the workpiece centerline 28, as well as for adjusting the vertical tooth alignment described above. This means includes a gib 31 having an inclined surface cooperating with a complementary inclined surface 32 on carriage 15 and disposed between carriage 15 and tool 13, gib 31 being adjustable longitudinally by means indicated at 33. A similar gib 34 is disposed between tool 14 and carriage 17, being adjustable longitudinally by means 35. Rightward movement of gib 31 in FIGURE 1 with respect to tool 13 and carriage 15 will thus move tool 13 closer to workpiece centerline 28. Similarly, leftward movement of gib 34 in FIGURE 1 with respect to tool 14 and carriage 17 will move tool 14 closer to workpiece centerline 28. Leftward movement of gib 31 or rightward movement of gib 34 in FIGURE 1 will withdraw their respective tools 13 and 14 from the workpiece centerline.

The means for adjusting the relative vertical alignment of teeth 24 and 25 includes clamps 36 and 37 which secure the leading and trailing ends respectively of tool 13 to carriage 15, and clamps 38 and 39 which secure the leading and trailing ends respectively of tool 14 to carriage 17. Suitably placed abutment blocks are provided in conjunction with the clamps for longitudinally positioning the respective tools on their carriages.

FIG. 2 illustrates the location and mounting means for centers 26 and 27. Center 26 is mounted to the left of tools 13 and 14 as seen in FIG. 2 and projects into the throat of the machine, while center 27 is mounted in a tailstock assembly 40 carried by a cantilevered support arm 41 which extends from the upper end of frame 12. The reference numeral 42 indicates tie bars which connect the upper and lower frame portions for reinforcing purposes. A reciprocable fluid motor 43 is provided on tailstock assembly 40 for moving center 27 toward or away from center 26.

The novel and improved apparatus of the present invention comprises a rod 44 of generally cylindrical shape mountable between centers 26 and 27 as seen in FIG. 2. Rod 44 has a reduced cylindrical portion 45 adjacent tools 13 and 14, and a gauge generally indicated at 46 is slidably mounted on rod portion 45. The length of rod 44 with respect to its thickness is such that it will be capable of deflection in response to a lateral force exerted upon gauge 46 when inserted in the space between tools 13 and 14, as later described.

Gauge 46 comprises a set of teeth 47 which are generally like those on the workpiece to be formed, and a smooth cylindrical hub 48 extending axially from teeth 47 and usually of lesser diameter. A pair of spaced central bores 49 and 50 are formed in gauge 46, enabling it to be slidably mounted on rod portion 45.

Teeth 47 have a leading end 51 and a trailing end 52. At the trailing end, teeth 47 have exactly the shape to be formed on the workpiece. The teeth, however, taper slightly inwardly from end 52 to end 51, or stated another way, gauge teeth 47 flare slightly from their leading to their trailing ends. This flare is shown in exaggerated form in FIGS. 3 and 4 for purposes of the description; actually, in a typical instance, this flare might result in a difference in diameter on the order of about 0.020 inch between the leading and trailing ends, the length of teeth 47 being such that with this difference in diameter the taper will be very gradual.

A dial indicator generally indicated at 53 is provided for cooperation with cylindrical hub 48 of gauge 46, the length of this hub being at least equal to the length of teeth 47, so that plunger 54 of the dial indicator may maintain engagement with the hub during movement of the gauge from its fully withdrawn position as shown in FIG. 3 to a position in which teeth 47 are fully entered within the space between tools 13 and 14.

In operation, rod 44 will be mounted between centers 26 and 27, the centers being located exactly on workpiece centerline 28. To adjust tools 13 and 14 so as to have exactly the same vertical spacing from workpiece centerline 28, the tools will be moved by motors 19 and 22 to an intermediate position so that they at least partially overlap. Gibs 31 and 34 may be initially adjusted so that tools 13 and 14 are located at what is thought to be the correct distance from centerline 28.

Indicator 53 will be stationarily mounted on frame 12 by means 55 so that plunger 54 is in a vertical plane and is engageable with the portion of hub 48 adjacent teeth 47 when gauge 46 is in position shown in FIG. 3. Dial 56 may then be set to zero with respect to pointer 57. Gauge 46 will then be slid to the left in FIG. 3 on rod portion 45, so that teeth 47 enter the space between tools 13 and 14.

Assuming that tool 14 is vertically closer to centerline 28 than tool 13, there will be an asymmetrical engagement of gauge 46 with tools 13 and 14. That is, the top of gauge 46 will engage tool 14 before the bottom engages tool 13. Further inward movement of gauge 46 will thus cause deflection of rod 44 in a downward direction; this is indicated by axis 58 of rod 44, shown in its downwardly deflected position in FIG. 4. Pointer 57 of dial indicator 53 will thus move with respect to dial 56, since hub 48 will remain concentric with deflected rod 44 and will be followed by plunger 54. The amount of this deflection, upon full insertion of gauge 46 as shown in FIG. 4, may be noted.

Gauge 46 may then be withdrawn rightwardly to its FIG. 3 position and gib 34 moved rightwardly to withdraw tool 14 from centerline 28 a distance proportional to the noted deflection on indicator 53. The gauging and adjusting process may then be repeated until gauge teeth 47 engage tools 13 and 14 simultaneously at the trailing end 52 of teeth 47. Of course, if pointer 57 is initially deflected in the opposite direction from that shown in FIGURE 4, this will indicate that tool 13 is closer than tool 14 to centerline 28, and gib 31 will then be adjusted to the left in FIGURE 1 to withdraw tool 13 slightly downwardly. The checking may, of course, be done for various travel positions of tools 13 and 14.

To check the alignment of teeth 24 and 25 with respect to each other, dial indicator 53 will be stationarily mounted with respect to frame 12 by means indicated partially at 59 in FIGS. 5 and 6 so that plunger 54 is movable in a horizontal plane, being still engageable with hub 46 throughout the operative movement of gauge 46. With tools 13 and 14 in overlapping position as seen in FIGS. 5 and 6, gauge 46 will be slid along rod portion 45 from a retracted position into the space between the tools.

In the illustrated example, an even number of workpiece teeth or gauge teeth is shown, requiring crest-to-crest and trough-to-trough alignment between teeth 24 and 25 in plane 29 as described above. FIG. 6 illustrates a misalignment between teeth 24 and 25. As the tapered teeth 47 of gauge 46 enter the space between the teeth 24 and 25, the flanks of teeth 47 will therefore engage the flanks of either teeth 24 or 25 first, but will not engage both teeth 24 and 25 simultaneously because of their misalignment. The result of this asymmetrical engagement will be a rocking movement of gauge 46 about a center located at the flanks of the first-engaged teeth; this rocking center is indicated at 61 in FIG. 6. The center of rod 44 will thus be deflected in a substantially horizontal direction; this is indicated by the line 62 representing an extended diameter of gauge 46 in its shifted position. The deflection of rod 44 and thus of gauge hub 48 will be followed by plunger 54, resulting in a deflection of pointer 57 with respect to dial 56, this deflection being shown in FIG. 6.

Gauge 46 may then be withrawn and either tool 13 or 14 adjusted by means of its respective clamps 36 and 37 or 38 and 39. The direction of adjustment will be apparent from the direction of movement of pointer 57. If the pointer deflection indicates deflection of rod 44 to the left in FIG. 1 or 6, lower tool 13 should be shifted slightly to the right with respect to tool 14, or tool 14 shifted slightly to the right with respect to tool 13. The opposite direction of adjustment would be indicated by rightward deflection of rod 44 in FIG. 1 or 6. As discussed above, tooth alignment checking may be repeated for various travel positions of the tools. When teeth 24 and 25 are in proper alignment, gauge 46 may be fully inserted into the space between tools 13 and 14 without deflection of pointer 57. Each rack may be adjusted the amount of the indicator reading or one rack may be adjusted double the indicator reading.

While it will be apparent that the preferred embodiment of the invention disclosed is well calculated to fulfill the objects above stated, it will be appreciated that the invention is susceptible to modification, variation and change without departing from the proper scope of fair meaning of the subjoined claims.

What is claimed is:

1. In a method for checking the positioning of a pair of tools having facing sets of teeth with respect to the axis of a circular toothed workpiece to be formed between said tools, the steps of inserting a circular member with teeth shaped similarly to those of said workpiece between said tools in a direction parallel to said workpiece axis with the axis of said member coincident with the workpiece axis during tooth formation, and sensing any deflection of the axis of said member in directions at right angles to said workpiece axis during such insertion in response to asymmetrical engagement of the teeth of said member with said tools.

2. In a method for checking the relative distances from a workpiece axis of a pair of rack type tools with facing teeth and movable in opposite directions, the workpiece axis being disposed between said tools and extending at right angles to their directions of movement, the steps of supporting a member having teeth similar to those on the workpiece to be formed in a manner such that the support is yieldable in a direction at right angles to the workpiece axis and to the direction of tool movement, moving said member while so supported in a direction parallel to the workpiece axis into the space between said tools and with the member axis coincident with the workpiece axis, and sensing any deflection of said member and said yieldable support in said direction at right angles to the workpiece axis and the direction of tool movement due to a discrepancy in the spacing of the two tools from the workpiece axis.

3. In a method for checking the relative alignment of the teeth of a pair of rack type tools having facing sets of teeth which are to form teeth on a workpiece rotatable about an axis between the tools by simultaneous movement in opposite directions, the steps of supporting a member having teeth similar to those on the workpiece to be formed in such a manner as to permit yielding of the support in a direction at right angles to said workpiece axis and parallel to the directions of tool movement, inserting said member between said tools while so supported in a direction parallel to the workpiece axis into the space between said tools with the axis of said member coincident with the workpiece axis, and sensing any deflection of said support in said direction at right angles to the workpiece axis and parallel to said directions of tool movement due to misalignment of the tool teeth with respect to a plane passing through the workpiece axis and at right angles to the direction of tool movement.

4. In a method for detecting discrepancies in tool spacing and tooth alignment of a pair of oppositely movable tools having facing sets of teeth for simultaneusly forming teeth on a workpiece rotatable about an axis between said tools, the steps of supporting a member having teeth similar to those to be formed on the workpiece in a manner which is yieldable in two directions at right angles to each other and to the workpiece axis, moving said member in a direction parallel to the workpiece axis into the space between said tools while so supported and with the axis of said member coincident with the workpiece axis, detecting any deflection of said member due to a discrepancy in the spacing of said two tools from said axis, and detecting any deflection of said member due to misalignment of said two sets of tool teeth with respect to a plane passing through the workpiece axis and at right angles to the directions of the tool movement.

5. In an apparatus for checking the positioning of a pair of tools having facing surfaces for simultaneously engaging a workpiece positioned therebetween, a gauge having a shape similar to that of the workpiece to be formed, a rod extending within said surfaces, means supporting the opposite ends of said rod, said gauge being slidably mounted on said rod, the rod being so dimensioned as to be laterally reflectable in response to asymmetrical engament of said member with said tools, and means for detecting such deflection.

6. In an apparatus for checking the positioning of a pair of spaced tools having facing sets of teeth relative to the axis of a rotatable workpiece to be formed between said tools, a circular gauge having teeth similar to those to be formed on the workpiece, means supporting said gauge for sliding movement along said workpiece axis into and out of the space between said tools, said gauge tapering slightly so that the diameter of said gauge teeth at its leading end when entering said space is slightly smaller than the diameter of said teeth at the trailing end, and means for detecting any lateral deflection of said gauge when inserted into said space due to asymmetrical engagement of the gauge with said tools.

7. In an apparatus for checking the positioning of a pair of spaced tools having facing sets of teeth relative to the axis of a rotatable workpiece to be formed between said tools, a circular gauge having teeth similar to those to be formed on the workpiece, means supporting said gauge for sliding movement along said workpiece axis into and out of the space between said tools, said gauge tapering slightly so that the diameter of said gauge teeth at its leading end when entering said space is slightly smaller than the diameter of said teeth at the trailing end, said gauge supporting means comprising a rod extending into said space, means supporting the opposite ends of said rod, the rod being so dimensioned as to be laterally deflectable in response to asymmetrical engagement of said gauge with said tools, and means for detecting such deflection.

8. In an apparatus for checking the positioning of a pair of spaced tools having facing sets of teeth relative to the axis of a rotatable workpiece to be formed between said tools, a circular gauge having teeth similar to those to be formed on the workpiece, means supporting said gauge for sliding movement along said workpiece axis into and out of the space between said tools, said gauge tapering slightly so that the diameter of said gauge teeth at its leading end when entering said space is slightly smaller than the diameter of said teeth at the trailing end, a cylindrical hub on said gauge extending from the trailing end of said teeth, a dial indicator slidably engageable with said hub, and means for fixedly securing said dial indicator so as to detect deflection of said hub in a direction at right angles to said workpiece axis.

References Cited by the Examiner
UNITED STATES PATENTS
1,936,160  11/1933  George.

LEONARD FORMAN, *Primary Examiner.*
S. S. MATTHEWS, *Assistant Examiner.*